US012769140B2

(12) United States Patent
Schulz et al.

(10) Patent No.: US 12,769,140 B2
(45) Date of Patent: Oct. 20, 2026

(54) METHOD AND DEVICE FOR GENERATING LASER PULSES

(71) Applicant: TRUMPF Lasersystems for Semiconductor Manufacturing GmbH, Ditzingen (DE)

(72) Inventors: Joachim Schulz, Gerlingen (DE); Guenther Krauss, Holzgerlingen (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 328 days.

(21) Appl. No.: 18/605,858

(22) Filed: Mar. 15, 2024

(65) Prior Publication Data

US 2024/0255767 A1 Aug. 1, 2024

Related U.S. Application Data

(63) Continuation of application No. PCT/EP2021/075775, filed on Sep. 20, 2021.

(51) Int. Cl.

| | |
|---|---|
| ***G02B 27/09*** | (2006.01) |
| ***G02B 27/14*** | (2006.01) |
| ***H01S 3/223*** | (2006.01) |
| ***H01S 3/23*** | (2006.01) |
| ***H05G 2/00*** | (2006.01) |

(52) U.S. Cl.
CPC ..... *G02B 27/0905* (2013.01); *G02B 27/0977* (2013.01); *G02B 27/141* (2013.01);
(Continued)

(58) Field of Classification Search
CPC ............ G02B 27/0905; G02B 27/0977; G02B 27/141; H05G 2/0084; H05G 2/0086;
(Continued)

(56) References Cited

U.S. PATENT DOCUMENTS

| | | | |
|---|---|---|---|
| 10,186,827 | B2 | 1/2019 | Schulz et al. |
| 2011/0057126 | A1 | 3/2011 | Hoshino et al. |

(Continued)

FOREIGN PATENT DOCUMENTS

| | | | |
|---|---|---|---|
| JP | 2008204815 | A | 9/2008 |
| KR | 20170031709 | A | 3/2017 |

(Continued)

OTHER PUBLICATIONS

Stark, et al ("Divided-pulse amplification with fiber-coupled electro-optic modulators", Proceedings of SPIE, vol. 10083, Feb. 22, 2017, pp. 1008308-1008308, XP060085445) (Year: 2017).*

(Continued)

*Primary Examiner* — Michael Maskell
(74) *Attorney, Agent, or Firm* — LEYDIG, VOIT & MAYER, LTD.

(57) ABSTRACT

A method for generating laser pulses includes generating first laser pulses and second laser pulses using at least one laser source, and amplifying the first laser pulses and second laser pulses using an optical amplifier. Each respective second laser pulse passes through the optical amplifier offset in time in relation to a respective first laser pulse by a time offset. The method further includes separating the first laser pulses from the second laser pulses using an optical beam splitter based on at least one beam property, and passing the first laser pulses through a retardation unit. A time duration for each respective first laser pulse to pass through a retardation section of the retardation unit corresponds to the time offset. The method further includes superimposing the first laser pulses with the second laser pulses using a superposition unit to form superimposed laser pulses.

17 Claims, 4 Drawing Sheets

(52) U.S. Cl.
CPC ......... *H05G 2/0084* (2024.08); *H05G 2/0086* (2024.08); *H01S 3/2232* (2013.01); *H01S 3/2316* (2013.01)

(58) Field of Classification Search
CPC ... H05G 2/0035; H01S 3/2232; H01S 3/2316; H01S 3/0057; H01S 3/2366; H01S 3/005
USPC ...................................................... 250/504 R
See application file for complete search history.

(56) References Cited

U.S. PATENT DOCUMENTS

2011/0267671 A1 11/2011 Peng et al.
2022/0109281 A1 4/2022 Delaigue et al.

FOREIGN PATENT DOCUMENTS

WO WO 2012044374 A2 4/2012
WO WO 2020161433 A1 8/2020
WO WO 2021121531 A1 6/2021

OTHER PUBLICATIONS

Stark Henning, et al., "Divided-pulse amplification with fiber-coupled electro-optic modulators," Fiber Lasers XIV: Technology and Systems, Feb. 22, 2017, pp. 25-29, vol. 10083, SPIE, Bellingham, Washington USA.
Kienel Marco, et al.,"Energy scaling of femtosecond amplifiers using actively controlled divided-pulse amplification," Optics letters, Feb. 15, 2014, pp. 1049-1052, vol. 39, Issue 4, Optica Publishing Group, Washington DC, USA.

* cited by examiner

METHOD AND DEVICE FOR GENERATING LASER PULSES

CROSS REFERENCE TO RELATED APPLICATIONS

This application is a continuation of International Application No. PCT/EP2021/075775 (WO 2023/041180 A1), filed on Sep. 20, 2021, and claims benefit to PCT/EP2021/075775, filed on filed on Sep. 20, 2021. The aforementioned application is hereby incorporated by reference herein.

FIELD

Embodiments of the present invention relate to a method and a device for generating laser pulses.

BACKGROUND

Using laser pulses to generate a plasma for generating extreme ultraviolet (EUV) radiation for EUV lithography is known. The EUV radiation can in particular be generated in a target material irradiated using laser pulses, preferably in the form of a tin droplet.

The laser pulses are generated for this purpose in a seed source and amplified in the amplifiers of an amplifier unit. The laser pulses amplified in the amplifier unit are guided via a beam guiding unit to a focusing unit, which focuses the laser pulses in a target area in which the target material is provided. The target material is typically provided in the form of a droplet by a droplet source, which emits droplets at a fixed time interval. These droplets are irradiated using the laser pulses and as a result emit (EUV) radiation. Each droplet is struck by at least one laser pulse, so that the frequency at which the droplet source is operated corresponds to the frequency at which the seed source emits the laser pulses.

The power of the radiation emitted by the target material is dependent here, among other things, on the pulse duration and the energy of the laser pulses with which the target material is irradiated. The greater the pulse energy of the laser pulses, the higher the power is of the EUV radiation emitted by the target material. The pulse duration also influences the EUV yield. Shorter pulses tend to be advantageous here.

The laser pulses generated in the seed source enter an amplifier of the amplifying unit and are amplified therein. The amplifier comprises an amplification medium, such as $CO_2$ or a solid.

If the amplifier is operated in saturation, the energy level which was emptied by stimulated emission can be refilled by adjacent energy levels which have not participated in the laser transition. This takes place on a time scale characteristic for the respective amplification medium.

If an incident pulse is now observed, the power of which is sufficient to completely empty the excited energy level by stimulated emission and which is short enough that this energy level cannot be refilled during the pulse duration by adjacent energy levels, the following is observed: The first part of the time curve of the pulse is strongly exaggerated and then first drops off rapidly and then slower and slower. The first part of the pulse thus already saturates the amplifier, so that no power is still available for the rear (later) part of the pulse.

On the other hand, if a pulse incident in the amplifier is observed, the power of which is sufficient to completely empty the excited energy level by stimulated emission and which is sufficiently long that this energy level can be refilled during its duration by adjacent energy levels, the pulse power then first strongly rises as in the above described short pulse, in order to then drop again. However, the falling flank continues over a longer period of time, since the energy level is continuously refilled from the adjacent levels. The first part of the pulse does saturate the amplifier, but the emptied energy level is then refilled by adjacent energy levels.

The energy yield is thus limited with short pulses, since with short pulses the first part of the laser pulse already saturates the amplifier, so that power no longer remains for the later part of the laser pulse.

SUMMARY

Embodiments of the present invention provide a method for generating laser pulses. The method includes generating first laser pulses and second laser pulses using at least one laser source, and amplifying the first laser pulses and second laser pulses using an optical amplifier. Each respective second laser pulse passes through the optical amplifier offset in time in relation to a respective first laser pulse by a time offset. The method further includes separating the first laser pulses from the second laser pulses using an optical beam splitter based on at least one beam property, in which the first laser pulses differ from the second laser pulses, and passing the first laser pulses through a retardation unit. A time duration for each respective first laser pulse to pass through a retardation section of the retardation unit corresponds to the time offset in relation to the respective second laser pulse. The second laser pulses do not pass through the retardation unit. The method further includes superimposing the first laser pulses with the second laser pulses using a superposition unit to form superimposed laser pulses.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
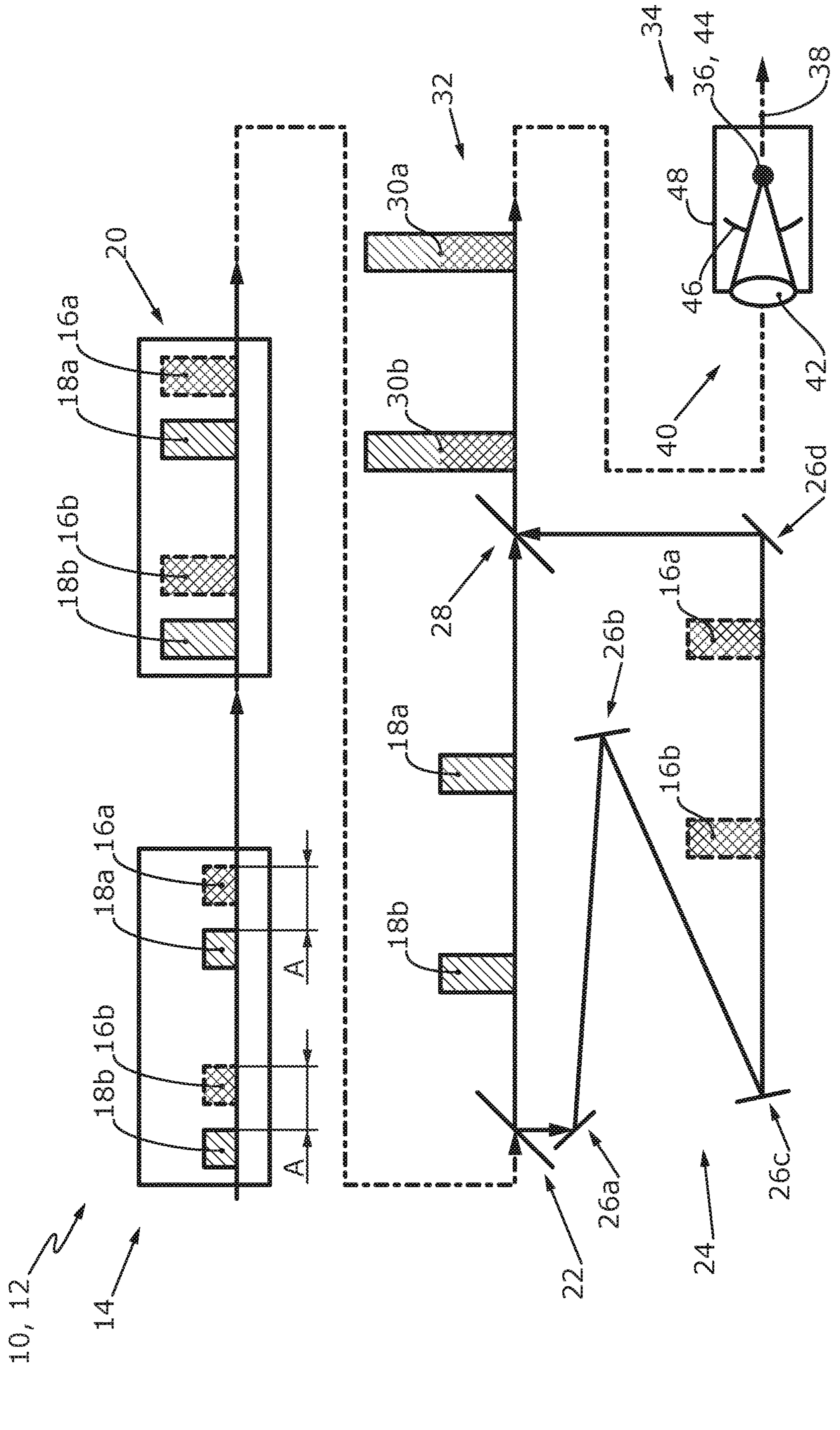
FIG. 1 schematically shows a device and a method for generating laser pulses according to embodiments of the invention.

Embodiments of the present invention provide a method and a device which enable high-energy short laser pulses to be generated.

According to embodiments of the present invention, a method for generating laser pulses comprising the following method steps:

A) generating first laser pulses and second laser pulses in at least one laser source;

B) amplifying the first and second laser pulses, wherein the second laser pulses each pass through the amplifier offset in time in relation to the first laser pulses and the second laser pulses differ from the first laser pulses due to at least one beam property;

C) spatially separating the first laser pulses from the second laser pulses on the basis of the at least one beam property, due to which the second laser pulses differ from the first laser pulses;

D) delaying the first laser pulses in relation to the second laser pulses by the time interval between the first and second laser pulses;

E) superimposing the first laser pulses and the second laser pulses to form chronologically and spatially superimposed laser pulses.

If not indicated otherwise, the lists are not to be viewed as exhaustive, but rather as "at least". In particular, in addition to the first laser pulses and second laser pulses, further laser pulses (for example third laser pulses, third and fourth laser pulses, etc.) can be used.

In order to generate a short laser pulse of high power, two short pulses, in particular of equal length, are introduced into the same amplifier in a time interval in which the excited energy level participating in the laser transition is at least partially refilled from adjacent energy levels. The laser pulses, before they are amplified, can have the same or also different maximum powers. Depending on the time interval, the excited energy level participating in the laser transition is completely or partially refilled upon introduction of the second laser pulse into the amplifier.

If the excited energy level is already completely refilled, a maximum possible amplification thus results for the second laser pulse. If the excited energy level is not yet completely refilled, a lesser amplification results. In the case of incident laser pulses of equal maximum power, the maximum power of the second laser pulse is less in this case after its amplification than that of the first laser pulse.

After the two laser pulses have passed through the amplifier (or amplifiers), they are chronologically superimposed again. A laser pulse results, the pulse form and duration of which essentially correspond to the pulse form and duration of the two short laser pulses. The maximum power of the superimposed laser pulse or its energy is, however, up to twice as high as the power or energy of the individual laser pulses before they are superimposed. Superimposed laser pulses having high power or energy and short pulse duration can thus be achieved by the amplification of individual short laser pulses in a laser pulse train and the subsequent superposition thereof.

The pulse duration of a short laser pulse and thus the pulse duration of the first and second laser pulses is between 10 ns and 200 ns here, preferably between 20 ns and 100 ns. The pulse duration of a long laser pulse is greater than 200 ns here. The amplification medium is preferably $CO_2$.

The superimposed laser pulses are preferably output at a rate between 10 kHz and 500 kHz, in particular between 20 kHz and 200 kHz, preferably between 30 kHz and 100 kHz. The rate of the laser pulses is preferably oriented here to the rate of a droplet source, thus of a target material in a target area.

The first laser pulses preferably differ from the generated second laser pulses due to their wavelength and/or their polarization. This enables the first laser pulses to be separated from the second laser pulses. The first laser pulses separated from the second laser pulses can then pass through a retardation section, through which the second laser pulses do not pass.

The first and second laser pulses can already have different wavelengths or polarizations directly upon their generation. In particular, the first and second laser pulses can be generated by two separate beam sources, which each generate laser pulses having different beam properties, such as wavelength or polarization. These can in particular be two $CO_2$ lasers, which are operated at different wavelengths.

The different beam properties, such as wavelength or polarization, can also be applied to the first and/or second laser pulses after they are generated. In this case, the first and second laser pulses are preferably initially generated in a single beam source having the same beam properties. However, the first and second laser pulses can also be generated in different beam sources having the same beam properties. The different beam properties are applied to them (in both cases) in a following method step. The polarization of the first or second laser pulses can be rotated here with the aid of a retardation plate (such as a half-wave plate) or a Pockels cell, in particular with the aid of an electro-optical modulator (EOM). Alternatively, the frequency of the first or second laser pulses can also be shifted with the aid of a frequency shifting unit, for example an acousto-optical modulator.

The second laser pulses can be generated with a time delay to the generation of the first laser pulses. In particular a control unit can be used to set the time interval of the first laser pulses in relation to the second laser pulses. The first and second laser pulses can be generated here in different or also in a single laser source.

The time interval between first and second laser pulses can however in particular also be set in that the second laser pulses pass through a longer route after they are generated than the first laser pulses. The first and second laser pulses can be generated here in different laser sources. A control unit can be used, which controls the laser sources so that the laser pulses meet in method step E) to form superimposed laser pulses.

In a further preferred embodiment of the invention, the second laser pulses follow the first laser pulses at a constant time interval.

The time interval between the first laser pulses and the second laser pulses is preferably between 10 ns and 1500 ns, in particular between 50 ns and 1000 ns, preferably between 80 ns and 500 ns. The maximum possible amplification of the second laser pulse is dependent here on the time interval between the first and second laser pulses. The greater the time interval is between the first and the second laser pulses, the more completely the excited energy level participating in the laser transition is refilled by adjacent energy levels and the more strongly the second laser pulse can be amplified.

On the other hand, the rate of the superimposed laser pulses which strike the droplet is predetermined by the rate of the droplet source. Since sufficient energy also has to be present again in the amplifier for the next pulse sequence made up of first and second laser pulse, there is a maximum time interval between the first and second laser pulse from which—depending on the clock rate of the droplet source—the following pulse sequence can no longer be optimally amplified.

It is ensured by the above-mentioned values that both the following pulse sequence made up of first and second laser pulse and the second laser pulse of the observed pulse sequence can be amplified at a predetermined clock rate of between 10 kHz and 500 kHz, in particular between 20 kHz and 200 kHz, preferably between 30 kHz and 100 kHz.

The above-mentioned values moreover take into consideration that the length of the retardation section which the second laser pulse has passed through assumes a technically reasonable value (for example between 3 m and 450 m).

The amplifier unit is preferably designed in the form of an amplifier chain. Efficient amplification of the laser pulses can take place in this way.

The laser source and the amplifier unit preferably involve $CO_2$ lasers and amplifiers, respectively.

The splitting of the laser pulses is preferably performed using a dichroic mirror. This preferably takes place when the laser pulses differ in their wavelength. Alternatively thereto, the splitting can be performed using a polarization mirror. This preferably takes place when the laser pulses differ in their polarization.

The retardation unit is preferably designed in the form of a retardation section. The retardation section can have multiple reflective optical elements. The retardation can thus take place in a simply designed manner.

The combination of the laser pulses after the retardation unit is preferably carried out using a dichroic mirror. This preferably takes place when the laser pulses differ in their wavelength. Alternatively thereto, the combination can be carried out using a polarization mirror.

Further preferably, the combined laser pulses are used to generate EUV radiation.

Embodiments of the invention also relate to a device for generating laser pulses, in particular for carrying out a method described here, comprising the following features:

a) at least one laser source for generating first laser pulses and second laser pulses, wherein the at least one laser source is designed to generate first and second laser pulses having different beam properties or the device is designed to apply at least one beam property different from the first laser pulses to the second laser pulses;

b) an optical amplifier unit for amplifying the first laser pulses and the second laser pulses, which differ in at least one beam property from the first laser pulses, wherein the amplifier unit is configured to have the second laser pulses pass through it offset in time in relation to the first laser pulses;

c) a separation unit for separating the first laser pulses from the second laser pulses on the basis of the at least one beam property;

d) a retardation unit for the first laser pulses, wherein the retardation corresponds to the distance of the second laser pulses from the first laser pulses;

e) a superposition unit for superimposing the first and second laser pulses to form superimposed laser pulses.

The generation of the first laser pulses and second laser pulses can take place in different laser sources. The device can comprise a control unit which is designed to control the laser sources so that the first laser pulses are superimposed with the second laser pulses in the superposition unit to form superimposed laser pulses.

The amplifier unit is preferably designed in the form of an amplifier chain, in particular made up of $CO_2$ amplifiers.

The separation unit and/or the superposition unit can be designed in the form of a dichroic mirror. Alternatively thereto, the superposition unit can be designed in the form of a polarization mirror.

The retardation unit can be designed in the form of a retardation section.

Further preferably, the output unit can have an EUV generating unit. The EUV generating unit has the above-described features for generating the superimposed laser pulses here. The superimposed laser pulses are preferably directed onto a target material that can be generated in the EUV generating unit ("EUV system"), in particular in the form of a tin droplet. A plasma can then arise in the target material, which emits the EUV radiation. The EUV generating unit can have a vacuum chamber, into which the target material can be introduced with the aid of a target source in a target area, a focusing unit for focusing the superimposed laser pulses in the target area, and a beam guiding unit for guiding the superimposed laser pulses to the focusing unit.

Further advantages of the invention may be found from the description and the drawing. Likewise, according to the invention the features mentioned above and those yet to be explained further may respectively be used individually or together in any desired combinations. The embodiments shown and described should not be understood as an exhaustive list, but rather are of an exemplary character for describing the invention.

FIG. 1 shows a device 10 according to embodiments of the invention for carrying out a method 12 according to embodiments of the invention.

First laser pulses 16*a*, 16*b* and second laser pulses 18*a*, 18*b* are generated here in a laser source 14, in the form of a seed source here. The first laser pulses 16*a, b* differ from the second laser pulses 18*a, b*, in particular in the wavelength and/or the polarization of their laser radiation.

The laser pulses 16*a, b*, 18*a, b* are amplified in an optical amplifier unit 20, in the form of an amplifier chain here.

According to embodiments of the invention, various laser pulses 16*a, b*, 18*a, b* are introduced into the amplifier unit 20, which can be amplified arriving in rapid succession in particular by using the energy from adjacent energy levels. The differentiation of the laser pulses 16*a, b*, 18*a, b* can contribute to the time interval between a first laser pulse 16*a, b* and a second laser pulse 18*a, b* not being limited by the filling of an energy level.

The time interval A between first laser pulses 16*a, b* and second laser pulses 18*a, b* is in particular equal. It is preferably between 10 ns and 1500 ns.

After the amplifier unit 20, the laser pulses 16*a, b*, 18*a, b* pass through a separation unit 22, here in the form of a dichroic mirror or a polarization mirror, where they are separated from one another on the basis of their wavelength or polarization.

The first laser pulses 16*a, b* then pass through a retardation unit 24, in the form of a retardation section here. The second laser pulses 18*a, b* do not pass through the retardation unit 24. Because the first laser pulses 16*a, b* pass through the retardation unit 24, the first laser pulses 16*a, b* can be chronologically superimposed with the second laser pulses 18*a, b*. At an exemplary interval A of 100 ns between the respective first laser pulses 16*a, b* and the respective second laser pulses 18*a, b*, the retardation section in air has a length of approximately 30 m. In order to design the retardation unit 24 compactly, it can have multiple deflection mirrors 26*a*, 26*b*, 26*c*, 26*d*.

The device 10 has a superposition unit 28, here in the form of a dichroic mirror or a polarization mirror. Due to the retardation unit 24, the respective first laser pulses 16*a, b* are combined with the respective second laser pulses 18*a, b* in the superposition unit 28 to form superimposed laser pulses 30*a*, 30*b*.

The superimposed laser pulses 30*a, b* are output in an output unit 32. In the present case, the output unit 32 has an extreme ultraviolet (EUV) light generating unit 34. A plasma for emitting EUV radiation 38 is generated in the EUV light generating unit 34 in a target material 36, in particular in the form of a tin droplet.

The EUV light generating unit 34 has a beam guiding unit 40 and a focusing unit 42. The focusing unit 42 is used to focus the superimposed laser pulses 30*a, b* in a target area 44, into which the target material 36 is introduced. The target material 36 enters a plasma state upon the irradiation using the laser pulses 30*a, b* and emits the EUV radiation 38, which is collected by means of a collector mirror 46.

In the example shown, the collector mirror 46 has an opening for the passage of the laser pulses 30*a, b* and the focusing unit 42 separates a vacuum chamber 48, in which the target material 36 is arranged, from the beam guiding unit 40.

The physical background of the embodiments of the invention will be described hereinafter on the basis of FIGS. 2*a-c:*

Figure 2A:
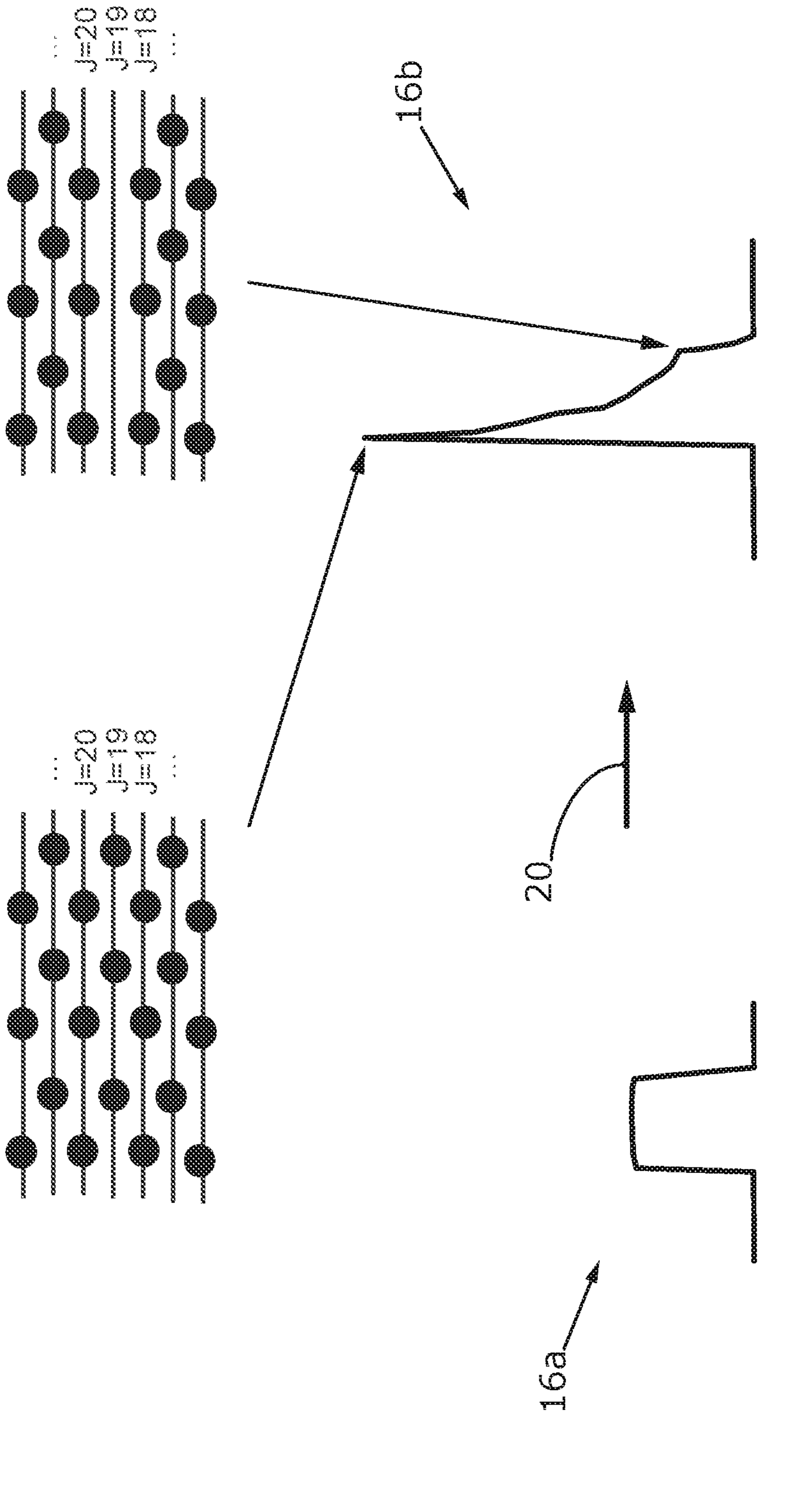
FIGS. 2a-c schematically illustrate the physical background of the embodiments of the invention.

FIG. 2*a* shows by way of example a short rectangular pulse 16*a*, which is provided for amplification in an amplifier unit 20. The power of the rectangular pulse 16*a* is sufficient to completely empty the excited energy levels of the amplifier 20 by stimulated emission, i.e., the amplifier 20 is operated in saturation. The rectangular pulse 16*a* is so short that these energy levels cannot be or can hardly be refilled during the pulse duration by adjacent energy levels not participating in the laser transition.

The rectangular pulse 16*a* is amplified in the amplifier 20; an amplified pulse 16*b* results. Its pulse power rises nearly vertically, to then drop off initially steeply, then slowly, and finally nearly vertically. The first part of the pulse 16*a* thus already saturates the amplifier 20, so that only a little power is still available for the rear part of the pulse. The nearly vertical rise and drop of the pulse power is attributed here to the rectangular shape of the incoming pulse 16*a*.

Figure 2B:
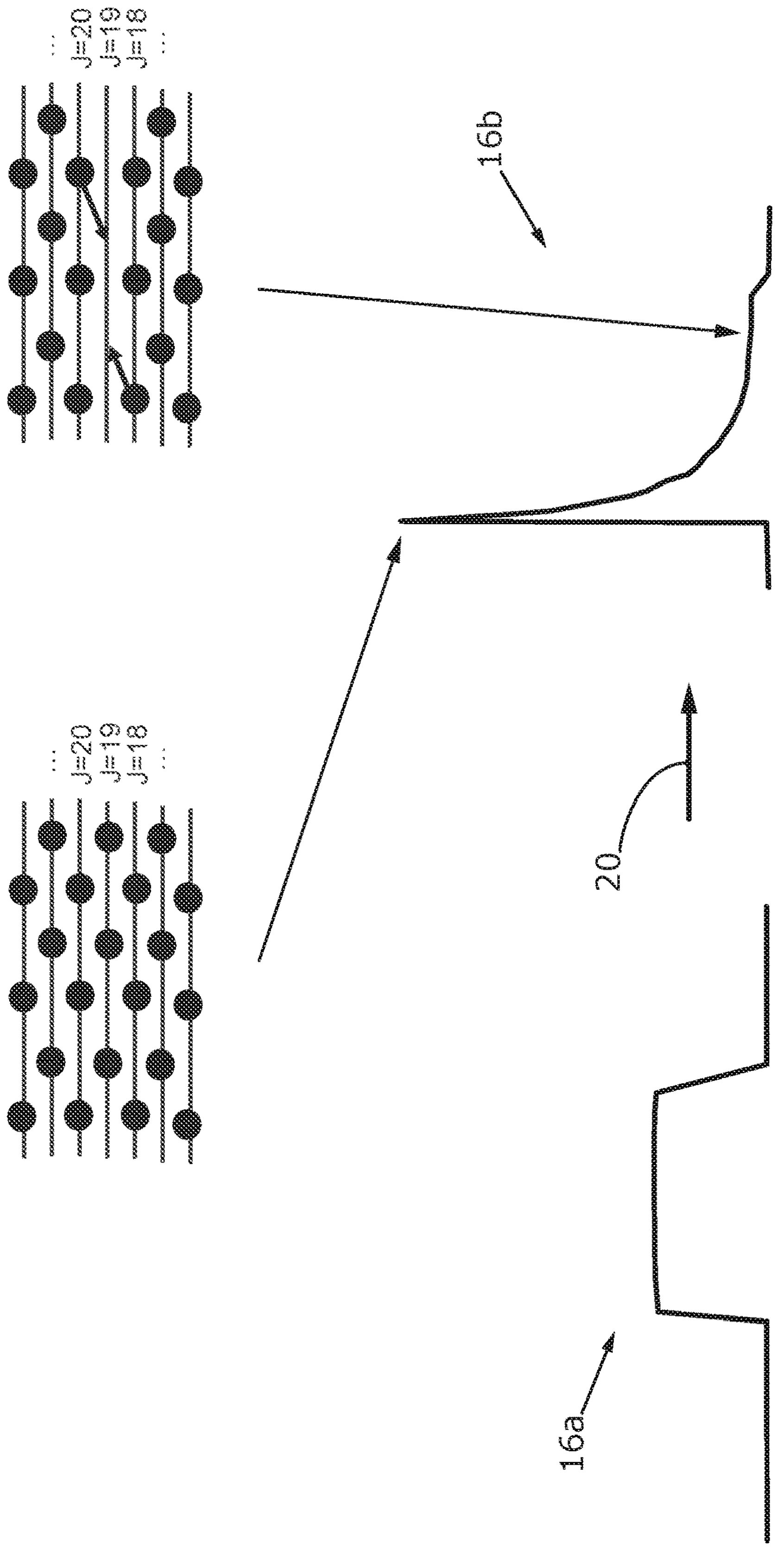

FIG. 2*b* shows a longer rectangular pulse 16*a*, which is provided for amplification in the amplifier 20. The power of the rectangular pulse 16*a* is sufficient to completely empty the excited energy levels participating in the laser transition by stimulated emission. The rectangular pulse 16*a* is so long that these energy levels can be refilled during its duration by adjacent energy levels. The pulse power of the resulting amplified long pulse 16*b* rises nearly vertically in this case due to the also steep rise of the pulse power of the incoming rectangular pulse 16*a* to then drop initially steeply and then slowly over a significantly longer period of time than in the case of the pulse 16*b* from FIG. 2*a*.

Due to the steep drop of the pulse power of the incoming rectangular pulse 16*a*, the pulse power again drops nearly vertically. The first part of the pulse 16*a* does saturate the amplifier, but the emptied energy levels are then refilled by adjacent energy levels.

Figure 2C:
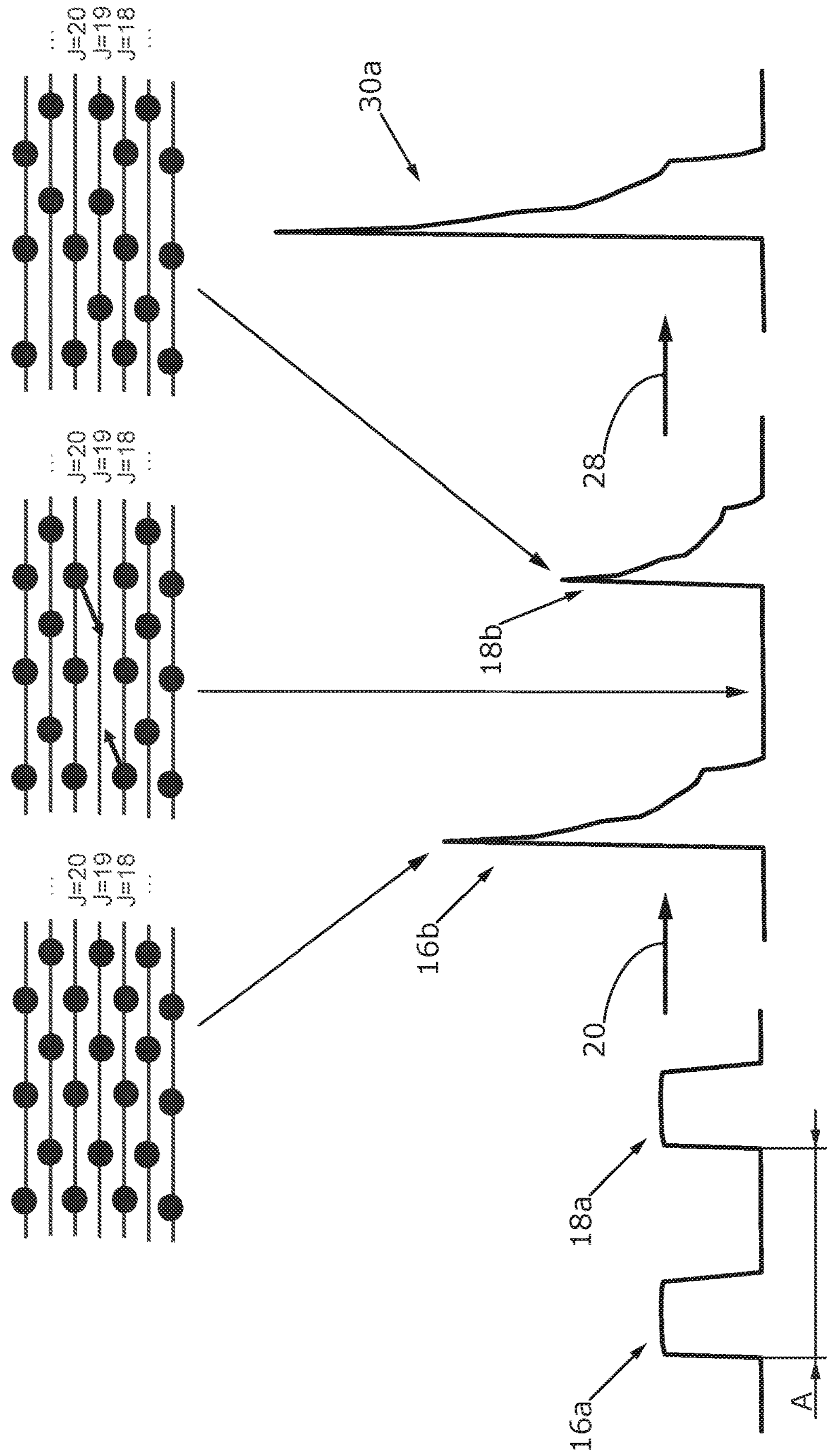

Two short rectangular pulses 16*a*, 18*a* at a time interval are shown in FIG. 2*c*. These are introduced into the same amplifier 20 in a time interval A in which the excited energy level participating in the laser transition is partially refilled from adjacent energy levels. The rectangular pulses 16*a*, 18*a* have the same maximum power before they are amplified. The second rectangular pulse 18*a* is now not amplified as strongly as the first rectangular pulse 16*a*. After the two rectangular pulses 16*a*, 18*a* have passed through the amplifier (or amplifiers) 20, they are superimposed in a superposition unit 28. A superimposed pulse 30*a* results, the pulse form and duration of which essentially correspond to the pulse form and duration of the two short amplified pulses 16*b*, 18*b*. However, the maximum power of the superimposed pulse 30*a* or its energy is up to twice as high as the power or energy of the individual pulses 16*b*, 18*b* before they are superimposed.

The pulse duration of a short rectangular pulse 16*a*, 16*b*, 18*a*, 18*b* is typically 50 ns, the pulse duration of a long rectangular pulse 16*a*, 16*b*, 18*a*, 18*b* is typically 500 ns. The time interval between the two rectangular pulses 16*a*, 16*b*, 18*a*, 18*b* is typically 100 ns. The pulse durations of the amplified pulses 16*b*, 18*b* approximately correspond to the pulse durations of the pulses 16*a*, 18*a*, which are not yet amplified.

As described above, embodiments of the invention relate to a method 12 for generating superimposed laser pulses 30*a, b*, which are each composed at least of first laser pulses 16*a, b* and second laser pulses 18*a, b*. The first and second laser pulses 16*a, b*, 18*a, b* are amplified using different properties. After the amplification, the first laser pulses 16*a, b* are retarded in relation to the second laser pulses 18*a, b* in order to superimpose them on the second laser pulses 18*a, b*. The superimposed laser pulses 30*a, b* are preferably used to generate extreme ultraviolet (EUV) radiation 38. Embodiments of the invention also relate to a device 10 for generating superimposed laser pulses 30*a, b*.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 device
12 method
14 laser source
16*a, b* first laser pulse
18*a, b* second laser pulse
20 optical amplifier unit
22 separation unit
24 retardation unit
26*a-d* deflection mirrors
28 superposition unit
30*a, b* superimposed laser pulse
32 output unit
34 extreme ultraviolet (EUV) light generating unit
36 target material
38 extreme ultraviolet (EUV) radiation
40 beam guiding unit
42 focusing unit
44 target area
46 collector mirror
48 vacuum chamber
A interval between first laser pulses 16*a, b* and second laser pulses 18*a, b*

The invention claimed is:

1. A method for generating laser pulses, the method comprising:

generating first laser pulses and second laser pulses using at least one laser source;

amplifying the first laser pulses and second laser pulses using an optical amplifier, wherein each respective second laser pulse passes through the optical amplifier offset in time in relation to a respective first laser pulse by a time offset;

separating the first laser pulses from the second laser pulses using an optical beam splitter based on at least one beam property, in which the first laser pulses differ from the second laser pulses;

passing the first laser pulses through a retardation unit, wherein a time duration for each respective first laser pulse to pass through a retardation section of the retardation unit corresponds to the time offset in relation to the respective second laser pulse, wherein the second laser pulses do not pass through the retardation unit; and superimposing the first laser pulses with the second laser pulses using a superposition unit to form superimposed laser pulses, wherein the superimposed laser pulses are used to generate extreme ultraviolet (EUV) radiation.

2. The method as claimed in claim 1, wherein the first laser pulses have a wavelength and/or a polarization state different from that of the second laser pulses.

3. The method as claimed in claim 1, wherein the generation of each respective second laser pulse takes place offset in time in relation to the generation of the respective first laser pulse.

4. The method as claimed in claim 1, wherein the first laser pulses are generated using a first laser source, and the second laser pulses are generated using a second laser source.

5. The method as claimed in claim 1, wherein each of the first laser pulses and the second laser pulses has a pulse duration between 10 ns and 200 ns.

6. The method as claimed in claim 1, wherein each second laser pulse is generated spaced apart from the respective first laser pulse by the time offset in a range between 10 ns and 1500 ns.

7. The method as claimed in claim 1, wherein each second laser pulse is generated spaced apart from the respective first laser pulse by the time offset in a range by between 50 ns and 1000 ns.

8. The method as claimed in claim 1, wherein each second laser pulse is generated spaced apart from the respective first laser pulse by the time offset in a range between 80 ns and 500 ns.

9. The method as claimed in claim 1, wherein the optical amplifier is configured in a form of an amplifier chain.

10. The method as claimed in claim 1, wherein the optical beam splitter comprises a dichroic mirror or a polarization mirror.

11. The method as claimed in claim 1, wherein the superimposition of the first laser pulses with the second laser pulses is performed using a dichroic mirror or a polarization mirror.

12. A extreme ultraviolet (EUV) radiation generating device comprising:

a device for generating laser pulses, the device comprising:

at least one laser source for generating first laser pulses and second laser pulses, wherein the first laser pulses have at least one beam property that is different from that of the second laser pulses;

an optical amplifier for amplifying the first laser pulses and the second laser pulses, wherein each respective second laser pulse passes through the optical amplifier offset in time in relation to a respective first laser pulse by a time offset;

an optical beam splitter for separating the first laser pulses from the second laser pulses based on the at least one beam property;

a retardation unit for the first laser pulses to pass therethrough, wherein a time duration for each respective first laser pulse to pass through a retardation section of the retardation unit corresponds to the time offset in relation to the respective second laser pulse, and wherein the second laser pulses do not pass through the retardation unit; and a superposition unit for superimposing the first laser pulses with the second laser pulses to form superimposed laser pulses; and a vacuum chamber, into which a target material is capable of being introduced in a target area and being irradiated by the superimposed laser pulses to generate EUV radiation.

13. The EUV radiation generating device as claimed in claim 12, wherein the optical amplifier is configured in a form of an amplifier chain.

14. The EUV radiation generating device as claimed in claim 13, wherein the optical amplifier comprises a plurality of $CO_2$ amplifiers.

15. The EUV radiation generating device as claimed in claim 12, wherein the optical beam splitter comprises a dichroic mirror or a polarization mirror.

16. The EUV radiation generating device as claimed in claim 12, wherein the superposition unit comprises a dichroic mirror or a polarization mirror.

17. The EUV radiation generating device according to claim 12, further comprising a focusing unit for focusing the superimposed laser pulses in the target area to generate the EUV radiation, and a beam guiding unit for guiding the superimposed laser pulses to the focusing unit.

* * * * *